United States Patent
Sutardja

(10) Patent No.: US 7,308,521 B1
(45) Date of Patent: *Dec. 11, 2007

(54) MULTI-PORT COMMUNICATIONS INTEGRATED CIRCUIT AND METHOD FOR FACILITATING COMMUNICATION BETWEEN A CENTRAL PROCESSING CHIPSET AND MULTIPLE COMMUNICATION PORTS

(75) Inventor: Sehat Sutardja, Los Altos Hills, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 11/506,555

(22) Filed: Aug. 18, 2006

Related U.S. Application Data

(63) Continuation of application No. 11/072,325, filed on Mar. 7, 2005, now Pat. No. 7,099,982, which is a continuation of application No. 09/987,824, filed on Nov. 16, 2001, now Pat. No. 6,898,655.

(51) Int. Cl.
- *G06F 13/00* (2006.01)
- *G06F 13/40* (2006.01)
- *H04L 12/28* (2006.01)
- *H04J 3/16* (2006.01)
- *G06F 3/14* (2006.01)
- *H03K 19/00* (2006.01)

(52) U.S. Cl. ............ 710/305; 710/313; 370/463; 370/910

(58) Field of Classification Search ........ 710/305, 710/2, 63, 72, 100, 313; 370/402, 463, 910; 345/519; 712/32, 33; 711/147; 709/201; 361/683

See application file for complete search history.

(56) References Cited

U.S. PATENT DOCUMENTS

| | | | |
|---|---|---|---|
| 5,423,002 A | 6/1995 | Hart | |
| 5,646,651 A | 7/1997 | Spannaus et al. | |
| 5,809,337 A | 9/1998 | Hannah et al. | |
| 5,970,069 A | 10/1999 | Kumar et al. | |
| 6,320,711 B2 | 11/2001 | Hill | |
| 6,516,374 B1 * | 2/2003 | Kinoshita et al. | 710/304 |
| 6,643,713 B2 * | 11/2003 | Nakagawa et al. | 710/5 |
| 6,665,807 B1 | 12/2003 | Kondo et al. | |
| 6,845,420 B2 | 1/2005 | Resnic | |
| 6,898,655 B1 * | 5/2005 | Sutardja | 710/305 |
| 7,099,982 B1 * | 8/2006 | Sutardja | 710/305 |
| 7,136,806 B2 * | 11/2006 | Miyahira et al. | 704/9 |

(Continued)

OTHER PUBLICATIONS

"Surveying today's most popular storage interfaces" by LoBue (abstract only) Publication Date: Dec. 2002.*

(Continued)

*Primary Examiner*—Gopal C. Ray

(57) ABSTRACT

A system includes a core chipset that is configured to communicate with a central processing unit. The system includes a memory bridge configured to communicate with memory. An accelerated graphics processor configured to communicate with a graphics device. An input/output bridge communicates with the memory bridge and the accelerated graphics processor and includes a bus controller. A Peripheral Component Interconnect-Extended (PCI-X) bus communicates with the bus controller. An integrated circuit includes a bus interface that communicates with the PCI-X bus. An Ethernet controller communicates with the bus interface. A serial advanced technology attachment (ATA) host adapter communicates with the bus interface and is configured to control a mass data storage unit.

12 Claims, 3 Drawing Sheets

U.S. PATENT DOCUMENTS

2006/0095629 A1* 5/2006 Gower et al. ............... 710/305

OTHER PUBLICATIONS

APT Technologies, Inc., "Serial ATA: High Speed Serialized AT Attachment," Revision 1.0, Aug. 29, 2001, pp. 1-7, 23-26.
"A low cost, high speed portable communications device: a case study using IDT RV 4640 microprocessor & IDT77903 ATM card" by Kakkar, S.; Hussain, A. B. (Abstract only).
"Flow control in a high-speed bus-based ATM switching hub" by Song Chong, ramesh Nagarajan, Yung-Terng Wang (Abstract only).
Min9 PCT FAQ.
PCI-X FAQ.
Serial ATA/High Speed Serialized AT Attachment, Serial ATA Workgroup, Revision 1.0.0.0 Nov. 15, 2000.
PCI-X Addendum to the PCI Local Bus Specification, revision 1.0a, PCI Special Intrest Group, Jul. 24, 2000.
PCI Local Bus Errata and Clarification to the PCI-X Addendum, Revision 1.0a, Update Mar. 12, 2001, Rev. P.
PCI Local Bus, PCI Local Bus Specificaion, Revision 2.2, Dec. 16, 1999.
PCI Local Bus, PCI-X Addendum to the PCI Local Bus Specification, Review Draft Revision 1.0, Jun 17, 1999.
PCI Local Bus, PCI-X Addendum to the PCI Local Bus Specification, Revision 1.0 Sep. 22, 1999.
"A low cost, high speed portable communications device: a case study using IDT RV 4640 microprocessor & IDT77903 ATM card" by Kakkar S.; Hussain, A.B. (Abstract only), unknown date.
"A low cost, high speed portable communications device: a case study using IDT RV 4640 microprocessor & IDT77903 ATM card" by Kakkar S.; Hussain, A. B. (Abstract only), unknown date.
Min9 PCT FAQ, unknown date.
PCI-X FAQ, unknown date.

* cited by examiner

MULTI-PORT COMMUNICATIONS INTEGRATED CIRCUIT AND METHOD FOR FACILITATING COMMUNICATION BETWEEN A CENTRAL PROCESSING CHIPSET AND MULTIPLE COMMUNICATION PORTS

CROSS-REFERENCE TO RELATED APPLICATIONS

This application is a continuation of U.S. patent application Ser. No. 11/072,325 filed on Mar. 7, 2005, which issued as U.S. Pat. No. 7,099,982 on Aug. 9, 2006 and is a continuation of U.S. application Ser. No. 09/987,824, filed Nov. 16, 2001, which issued as U.S. Pat. No. 6,898,655 on May 4, 2005.

BACKGROUND

1. Field of the Invention

This invention relates to integrated circuits, and more particularly to integrated circuits for interfacing to computer peripheral devices.

2. Background Information

Performance increases in computers are generally related to the evolution of components and assemblies such as memory, hard drives, processors, and graphics accelerators. Somewhat lagging in evolution has been the bus that is employed for interconnecting the components and assemblies of computers. Recently, several new standards for next generation high speed buses have been proposed. In addition, a new standard (Serial ATA) for interconnecting computer systems to internal storage units has been proposed. These new standards offer the promise of further increases in performance, but also present a new set of problems in creating workable interconnect designs.

SUMMARY OF THE INVENTION

An integrated circuit for multi-port communications is provided. The integrated circuit includes a high speed bus interface to interface to a core chipset through a high speed bus. A serial mass data storage host adapter is in communication with the high speed bus interface to control a high speed mass data storage unit. A network controller is in communication with the high speed bus interface to control a network port.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
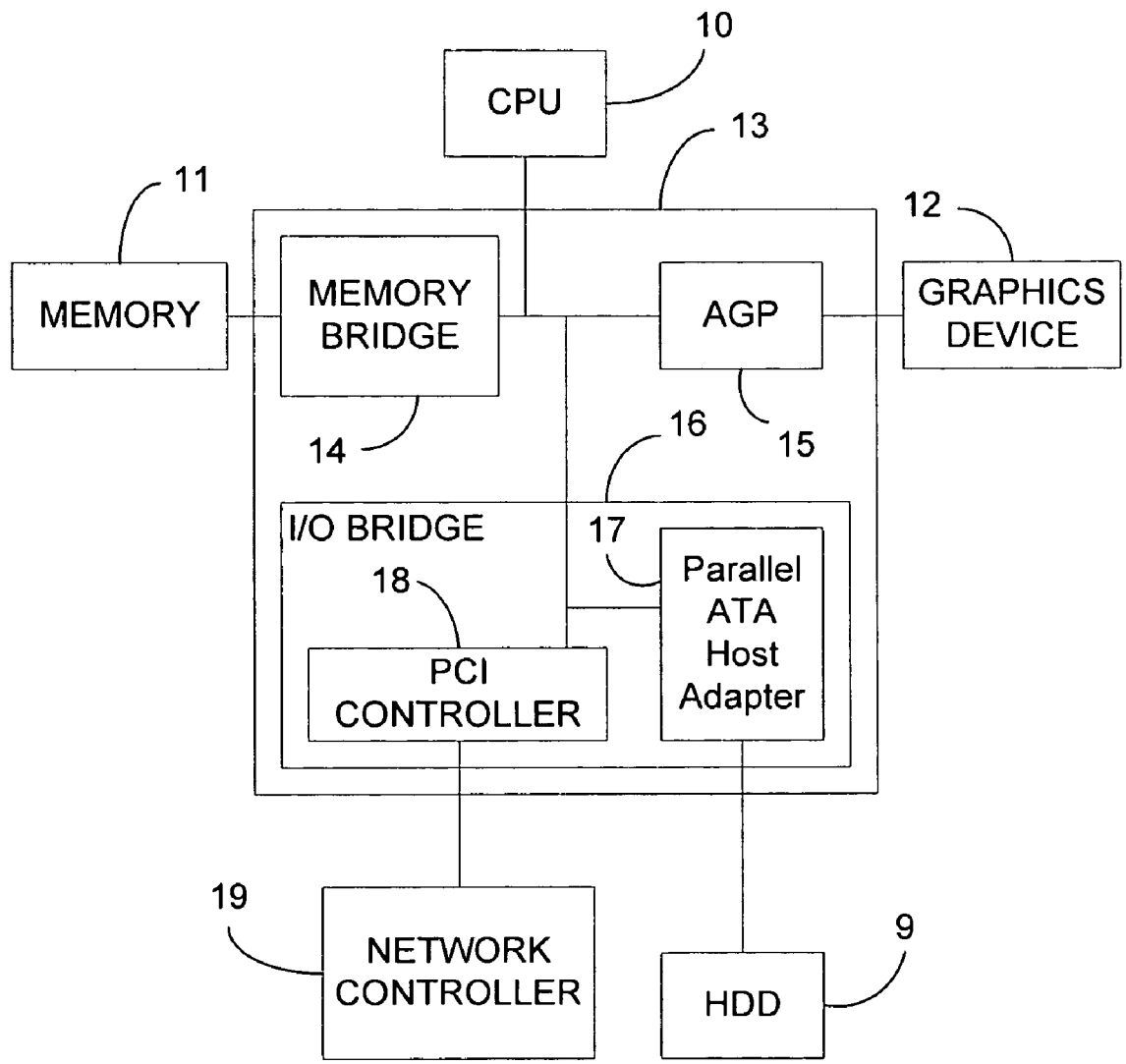
FIG. 1 is a block diagram of a conventional computer bus structure.

Shown in FIG. 1 is a block diagram of one conventional computer bus structure. The computer system core components comprising a processor 10, memory 11, and graphics device 12 may be connected to the peripheral components through a core chipset 13. The core chipset 13 typically includes a memory bridge 14 to control memory accesses, an accelerated graphics processor 15 to control graphics operations, and an I/O bridge 16 to control the flow of information over a local bus between the processor 10 and the peripheral devices. The I/O bridge 16 typically includes a parallel ATA host adapter 17 to connect a storage device 9 to the processor 10 over the local bus. A PCI controller 18 controls access to the local bus by I/O devices such as a network controller 19.

Figure 2:
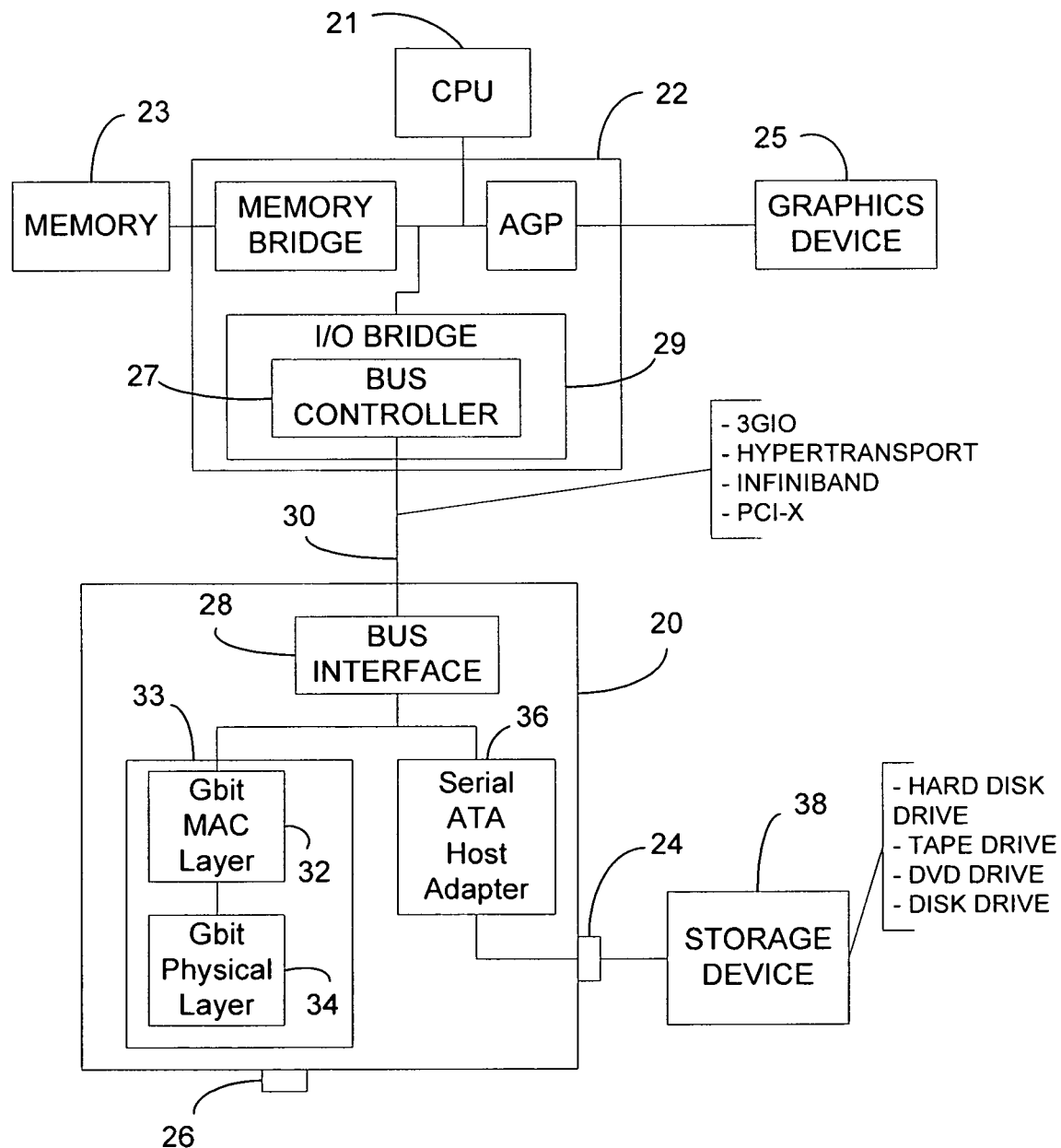
FIG. 2 is a block diagram of an embodiment of a multi-port communications chip coupled to a core chipset, in accordance with an exemplary embodiment of the present invention.

Shown in FIG. 2 is a block diagram of an embodiment of a multi-port communications chip 20 coupled to a core chipset 22. The multi-port communications chip 20 advantageously provides control for a serial ATA port 24 as well as a high speed Ethernet port 26 on a single integrated circuit that is outside of the core chipset 22. The integrated circuit is preferably formed on a single substrate using 0.18 um CMOS technology or smaller. However, the scope of the invention includes forming the integrated circuit in a multi-chip module.

The multi-port communications chip 20 may preferably be coupled between a high speed bus 30 and peripheral components including high speed network devices (not shown) and high speed storage devices 36. The high speed bus 30 couples input/output (I/O) devices to the computer system core components through the core chipset 22. The system core components may include a processor 21, memory 23, and graphics 25. The core chipset 22 may include a bus controller 27 within an I/O bridge 29 to control the flow of information between the high speed bus 30 and the system core components. The high speed bus 30 may comply with any high speed bus standard including HYPERTRANSPORT™, PCI-X (Peripheral Component Interconnect-Extended), 3GIO (Third Generation Input/Output), and INFINIBAND™.

The multi-port communications chip 20 preferably includes a single bus interface 28 to interface to the high speed bus 30. However, another bus interface may be included to interface to the core chipset 22 through another high speed bus. The bus interface includes interfaces such as HYPERTRANSPORT™ interfaces, PCI-X interfaces, 3GIO interfaces, and INFINIBAND™ interfaces.

A high speed Ethernet controller 33 preferably including a MAC (media access control) layer 32 and a physical layer 34 is coupled to the bus interface 28 to provide control functions for network devices (not shown) connected to the network port 26. The MAC layer 32 and physical layer 34 of the multi-port communications chip 20 are preferably used in conjunction with devices that supply the remainder of Ethernet controller functionality. The high speed Ethernet controller may have an operating speed of 1 Giga Bit or higher.

A serial ATA host adapter 36 may be coupled between the bus interface 30 and the serial ATA port 24. The serial ATA host adapter 36 connects the core chipset 22 and processor to a storage device 38 that may include a drive controller (not shown). The serial ATA host adapter 36 provides scalable performance starting at 1.5 gigabits per second, and software compatibility with conventional operating systems. Alternatively, the serial ATA host adapter 36 may couple to the core chipset 22 through another bus interface (not shown) and high speed bus. The storage device 38 includes devices such as hard drives, CD-ROM drives, DVD drives, CD-R/W drives, diskette drives, and tape storage drives.

Conventional systems typically include a parallel ATA host adapter within the core chipset. In addition, the trend in conventional systems is to integrate an increasing number of functions into fewer semiconductor devices such as the core chipset 22. The present invention recognizes the advantages of not including the serial ATA host adapter 36 in the core chipset 22, but instead including the serial ATA host adapter 36 in the multi-port communications chip 20. Serial ATA operates at a significantly higher data rate than parallel ATA, making the serial ATA host adapter more suitable for fabrication with mixed-signal CMOS processes than fabrication processes typically employed for the core chipset 22. Including the serial ATA host adapter 36 in the core chipset 22 would potentially increase costs due to more complex fabrication methods and possibly lower yields. Instead, the serial ATA host adaptor 36 is fabricated in a semiconductor device outside of the core chipset 22, which may result in faster time-to-market, improved yield, and lower cost. In addition, the serial ATA host adaptor 36 is combined with the high speed Ethernet controller 33, a function having similar fabrication requirements, into a single semiconductor device. Combining the serial ATA host adapter 36 and the Ethernet controller 33 into a single semiconductor device may decrease cost by combining functions that have similar fabrication requirements, reduce the required board area, and minimize chip count.

Also, in a preferred embodiment, recognizing that a single high speed bus 30 can support both the serial ATA host adaptor 36 and the high speed Ethernet controller 33 through a single bus interface 28, leads to the elimination of a separate bus interface and bus for each function. Older technology buses such as PCI (Peripheral Component Interface) do not have sufficient bandwidth on a single bus to adequately support both a storage device and network controller with present day multimedia requirements. Using a single bus interface 28 to interface both the serial ATA host adaptor 36 and the high speed Ethernet controller 33 to the high speed bus 30 further reduces complexity which may lead to further cost reduction, improved yield, and reduction in required board area.

Figure 3:
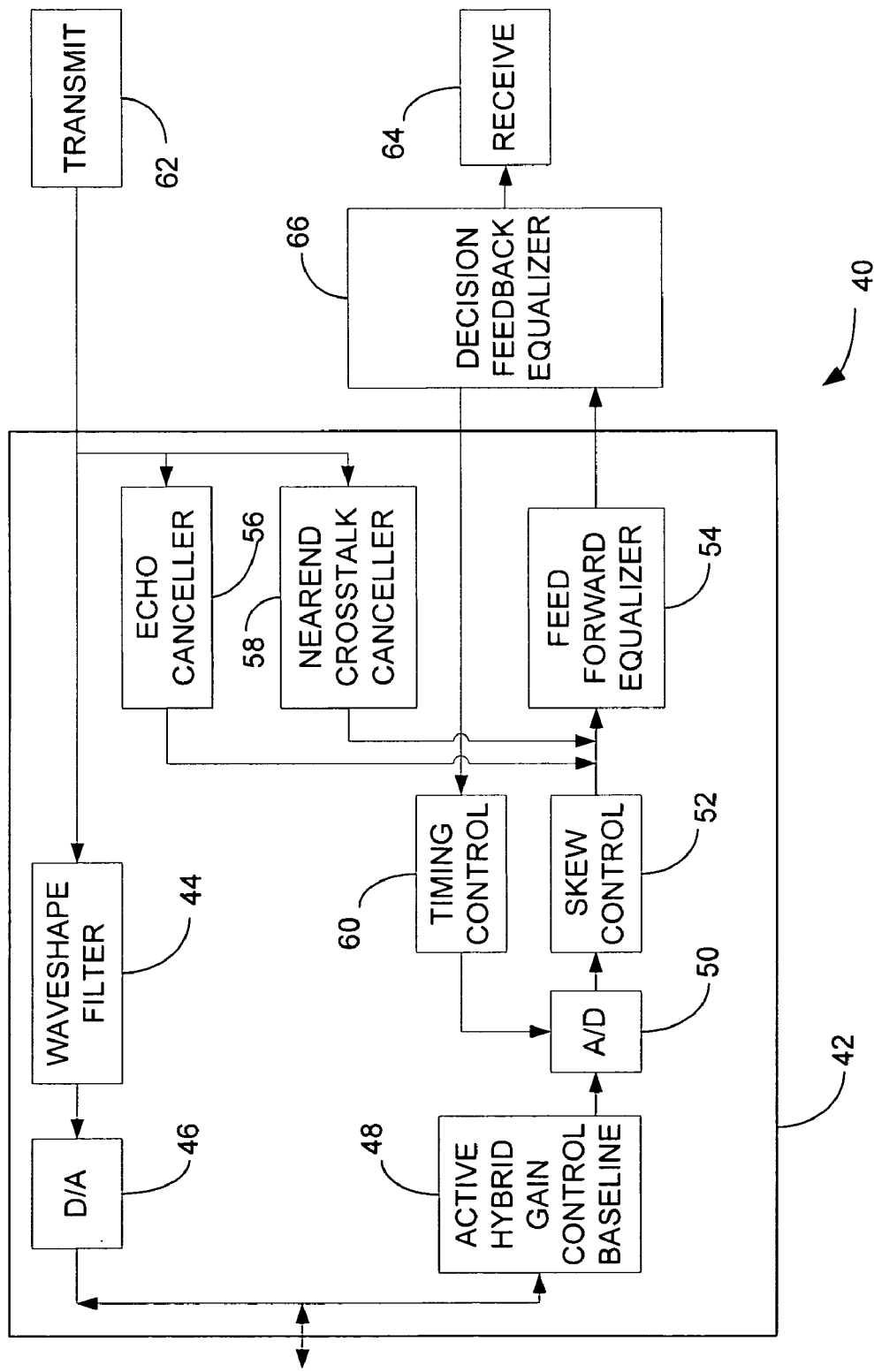
FIG. 3 is a block diagram of a high speed Ethernet controller, in accordance with an exemplary embodiment of the present invention.

FIG. 3 shows one embodiment of a high speed Ethernet physical layer device 40. The physical layer device 40 includes four channels 42 each operating at 250 MBits per second. Each of the channels 42 include in the transmit path a waveshape filter 44 coupled to a digital-to-analog converter 46. The receive path includes an active hybrid gain control baseline 48, analog-to-digital converter (A/D) 50, skew control 52, and feed forward equalizer 54 connected in series. An echo canceller 56 and crosstalk canceller 58 are coupled from the transmit path to the receive path. A timing control circuit 60 controls the timing of the A/D 50. A transmit circuit 62, receive circuit 64, and decision feedback equalizer 66 communicate with each of the channels 42.

A number of embodiments of the invention have been described. Nevertheless, it will be understood that various modifications may be made without departing from the spirit and scope of the invention. Accordingly, other embodiments are within the scope of the following claims.

What is claimed is:

1. A system comprising:
 a core chipset that is configured to communicate with a central processing unit and that comprises:
  a memory bridge configured to communicate with memory;
  an accelerated graphics processor configured to communicate with a graphics device; and
  an input/output bridge that communicates with the memory bridge and the accelerated graphics processor and that comprises a bus controller;
 a Peripheral Component Interconnect-Extended (PCI-X) bus that communicates with the bus controller; and
 an integrated circuit comprising:
  a bus interface that communicates with the PCI-X bus;
  an Ethernet controller that communicates with the bus interface; and
  a serial advanced technology attachment (ATA) host adapter that communicates with the bus interface and that is configured to control a mass data storage unit.

2. The system of claim 1 wherein the Ethernet controller includes:
 a medium access control (MAC) device that interfaces with at least one of the serial ATA host adapter and the bus interface; and
 a physical layer device in communication with a medium;
 wherein the Ethernet controller is configured to control a network port.

3. The system of claim 1 wherein the integrated circuit is implemented using a complementary metal oxide semiconductor (CMOS) process.

4. The system of claim 1 wherein the Ethernet controller operates at speeds greater than or equal to 1 Gigabit per second.

5. A system comprising:
 a core chipset that is configured to communicate with a central processing unit and that comprises:
  memory bridging means for bridging and configured for communicating with memory;
  graphics acceleration means for accelerating graphics processing and configured for communicating with a graphics device; and
  input/output bridging means for communicating with the memory bridging means and the graphics acceleration means and that comprises bus controlling means for controlling;
 bus means for transferring data and that is controlled by the bus controlling means, wherein the bus means includes a Peripheral Component Interconnect-Extended bus (PCI-X); and
 an integrated circuit comprising:
  bus interface means for interfacing with the bus means;
  Ethernet control means for communicating with the bus interface means and for providing a network interface; and
  serial advanced technology attachment (ATA) host adapting means for controlling mass data storing means for storing data via the bus interface means.

6. The system of claim 5 wherein the Ethernet control means includes:
 medium access control (MAC) means for interfacing with at least one of the bus interface means and the serial ATA host adapting means; and
 physical layer means for communicating with the MAC means and for interfacing with a medium,
 wherein the Ethernet control means is configured to control a network port.

7. The system of claim 5 wherein the integrated circuit is implemented using a complementary metal oxide semiconductor (CMOS) process.

8. The system of claim 5 wherein the Ethernet control means operates at speeds greater than or equal to 1 Gigabit per second.

9. A method comprising
configuring a core chipset to communicate with a central processing unit;
in the core chipset, providing a memory bridge configured to communicate with memory, an accelerated graphics processor configured to communicate with a graphics device, and an input/output bridge that communicates with the memory bridge and the accelerated graphics processor and that comprises a bus controller;
providing a Peripheral Component Interconnect-Extended (PCI-X) bus that communicates with the bus controller; and
providing an integrated circuit comprising a bus interface that communicates with the PCI-X bus, an Ethernet controller that interfaces with the core chipset through the PCI-X bus and the bus interface, and a serial advanced technology attachment (ATA) host adapter in communication with the bus interface and configured to control a mass data storage unit.

10. The method of claim 9 wherein the Ethernet controller includes a medium access control (MAC) that interfaces with at least one of the serial ATA host adapter and the bus interface and a physical layer device in communication with a medium, wherein the Ethernet controller is configured to control a network port.

11. The method of claim 9 wherein the integrated circuit comprises a CMOS semiconductor.

12. The method of claim 9 wherein the Ethernet controller operates at speeds greater than or equal to 1 Gigabit per second.

* * * * *

UNITED STATES PATENT AND TRADEMARK OFFICE
CERTIFICATE OF CORRECTION

PATENT NO. : 7,308,521 B1
APPLICATION NO. : 11/506555
DATED : December 11, 2007
INVENTOR(S) : Sehat Sutardja It is certified that error appears in the above-identified patent and that said Letters Patent is hereby corrected as shown below:

Page 2      Delete reference "A low cost, high speed… (Abstract only)"
Column 2, Line 27      Delete "um" and insert -- µm --

Signed and Sealed this

Fifteenth Day of April, 2008

JON W. DUDAS
*Director of the United States Patent and Trademark Office*